United States Patent [19]
Hill et al.

[11] Patent Number: 5,722,924
[45] Date of Patent: Mar. 3, 1998

[54] ROLLER FOR CONVEYING WEB IN A RESIN COATING ENVIRONMENT

[75] Inventors: Lawrence Alexander Hill, Rochester; Leon Richard Hale, Bergen; Robert Seth Sherwin, Hilton, all of N.Y.

[73] Assignee: Eastman Kodak Company, Rochester, N.Y.

[21] Appl. No.: 636,436

[22] Filed: Apr. 23, 1996

[51] Int. Cl.⁶ .................................................. B23P 15/00
[52] U.S. Cl. ........................... 492/24; 492/38; 492/45; 492/47
[58] Field of Search .................. 492/24, 38, 39, 492/45, 47, 56

[56] References Cited

U.S. PATENT DOCUMENTS

| | | | |
|---|---|---|---|
| 700,513 | 5/1902 | Lange | 492/38 |
| 743,761 | 11/1903 | Sevey | 492/38 |
| 2,404,159 | 7/1946 | Barber | 492/38 |
| 2,727,280 | 12/1955 | Wati | 492/45 |
| 3,556,005 | 1/1971 | Koch | 492/47 |
| 4,864,704 | 9/1989 | Hogan et al. | 492/47 |
| 5,433,691 | 7/1995 | Huraoka | 492/45 |

*Primary Examiner*—Irene Cuda
*Attorney, Agent, or Firm*—Clyde E. Bailey, Sr.

[57] ABSTRACT

A roller for conveying web in a resin coating environment is formed by a core having solid polymeric material layers arranged on opposite end portions of a pressure sensitive layer. Means of securing the polymeric material layer to the core is provided to prevent the polymeric material from moving axially along the core. Hence, the polymeric material layer and pressure sensitive layer are arranged on the core to form a generally uniform rotatable web transport surface for conveying web exposed to molten polyethylene resin without the web transfer surface bearing the web being attacked and wetted with the coating material.

9 Claims, 2 Drawing Sheets

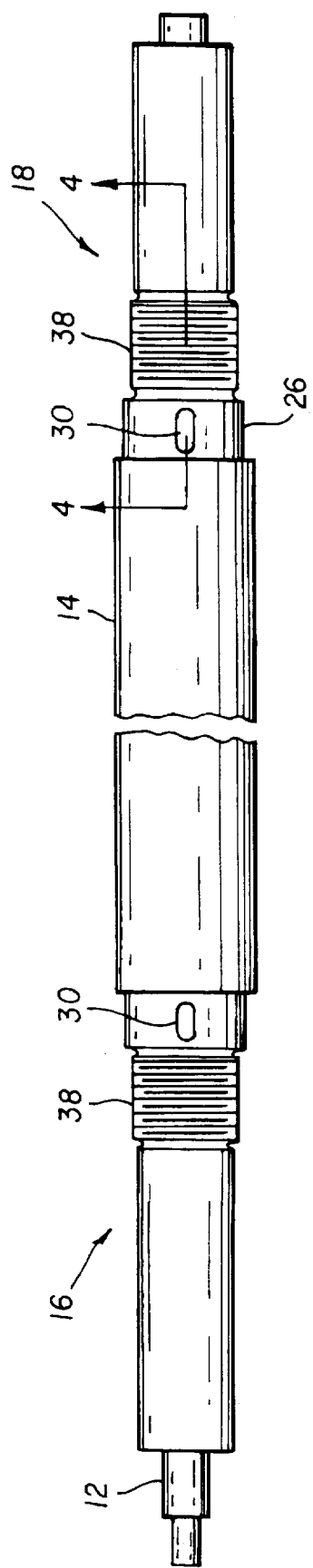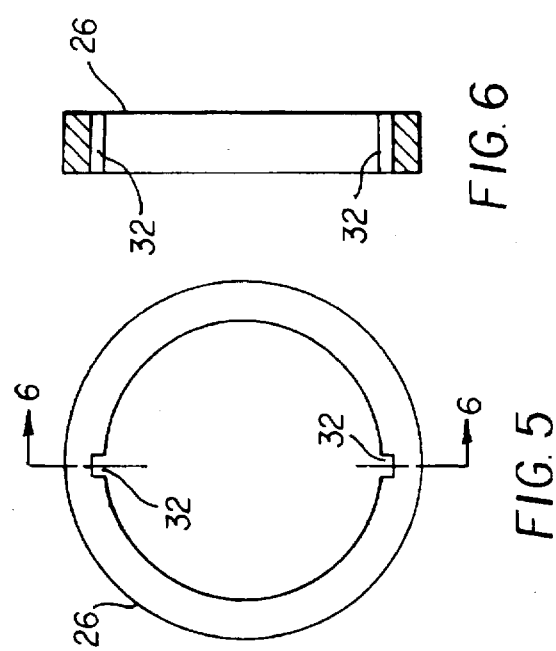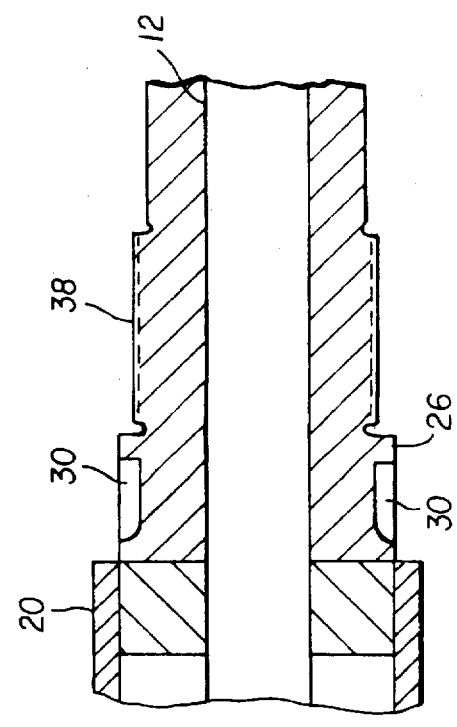

1

ROLLER FOR CONVEYING WEB IN A RESIN COATING ENVIRONMENT

FIELD OF THE INVENTION

The present invention relates to a roller for conveying web in a resin coating environment. More particularly, the invention is concerned with a pressure sensitive roller having a durable non-stick surface for conveying and freely releasing a web thereon that has been exposed to molten polyethylene coating material.

BACKGROUND OF THE INVENTION

Web conveyance pressure sensitive rollers used in resin coating operations, such as gravure printing machines, are exposed to coating material. Coating materials, such as molten polyethylene resin, will tend to attack the roller and adhere to it, thereby limiting the useful life of the roller. To prevent molten polyethylene resin from adhering to the pressure sensitive roller conveying the web, it is known in the art to wrap the ends of the roller with Teflon™ tape. It is generally known that Teflon™ tape applied on the end portions of the pressure sensitive roller will resist attacks and adherence by molten polyethylene resin, thus facilitating web release from the roller after it is coated. Hence, the operator would wrap several layers of tape around each end portion of the pressure sensitive roller so that the peripheral edges of the web will ride on a surface that promotes a quick release of the web after coating. However, due to the required high coating process pressure and heat, this tape (approximately 0.004 inches thick) has demonstrated a rather short life. Quite routinely, the tape tears away from the roller, or even more objectionable, deteriorates the quality of the product web. The failure of the tape often results in the equipment being shut down for a lengthy machine cleaning and grinding of the pressure roll. Thereafter, the roller would have to be re-taped with several layers of Teflon™ tape. Not unexpectedly, operators differ in the number of layers of tape that they apply on the pressure sensitive roller. A number of factors may effect the operators judgment as to layers of tape used and the wrapping technique employed. Primarily operator discretion is the predominant factor and the more experienced operator may be inclined to use more or less tape based on production run history. Since this is a known variable, it is difficult to achieve repeatable and reliable coating runs without the concern for coating material contamination.

Therefore, there persists a need for an improved pressure sensitive roller that provides a repeatable and reliable memos for releasably conveying a coined web while producing high quality product.

SUMMARY OF THE INVENTION

It is, therefore, an object of the invention to provide a roller that can be used for conveying web during coating with a molten polyethylene resin material without the resin material adhering to the roller.

Another object of the invention is to provide a pressure sensitive roller that does not require frequent maintenance due to coating material sticking to the pressure roller.

It is a feature of the invention that a web transport surface is formed by a pressure sensitive layer and a solid, thick polymeric material layer abuttingly secured on opposite ends of the pressure sensitive layer.

To solve one or more of the foregoing problems, there is provided, in one aspect of the invention, a roller for conveying web in a resin coating environment comprising a core having a main portion and first and second end portions. A pressure sensitive layer having a diameter ($d_1$) surrounds the core. The pressure sensitive layer extends widthwise along the main portion of the core between the first and second end portions. A solid polymeric material layer or Teflon sleeve is arranged on both end portions of the core abuttingly against the pressure sensitive layer. In this arrangement, the pressure sensitive layer and the abutting solid polymeric material layers form a generally uniform rotatable surface for conveying the web. Further, a threadable locking ring assembly is provided on both end portions of the core to secure the polymeric material layer or sleeve against the pressure sensitive layer on the core. By employing the locking ring assembly, the sleeve is restricted from axial movement along the core.

It is, therefore, an advantageous effect of the invention that it provides a more robust web transport surface at the interface of pressure sensitive roller and molten polyethylene resin coating material. It is another advantage of the invention that the thick solid polymeric sleeve abutting the pressure sensitive surface on the core of the pressure sensitive roller provides for longer roller life and subsequently less machine downtime. The invention also provides the advantage of eliminating operator variability associated with the prior art practice of winding tape onto the end portions of the pressure sensitive roller.

BRIEF DESCRIPTION OF THE DRAWINGS

The foregoing as well as other objects, features and advantages of this invention will become more apparent from the appended Figures, wherein like reference numerals denote like elements, and wherein:

FIG. 3 is a plan view of the complete pressure sensitive roller;

FIG. 4 is a partial section view along line 4—4 of FIG. 3 showing sleeve retention area;

FIG. 5 is an end view of the polymeric material sleeve; and,

FIG. 6 is a section view along line 6—6 of FIG. 5.

DETAILED DESCRIPTION OF THE DRAWINGS

Figure 1:
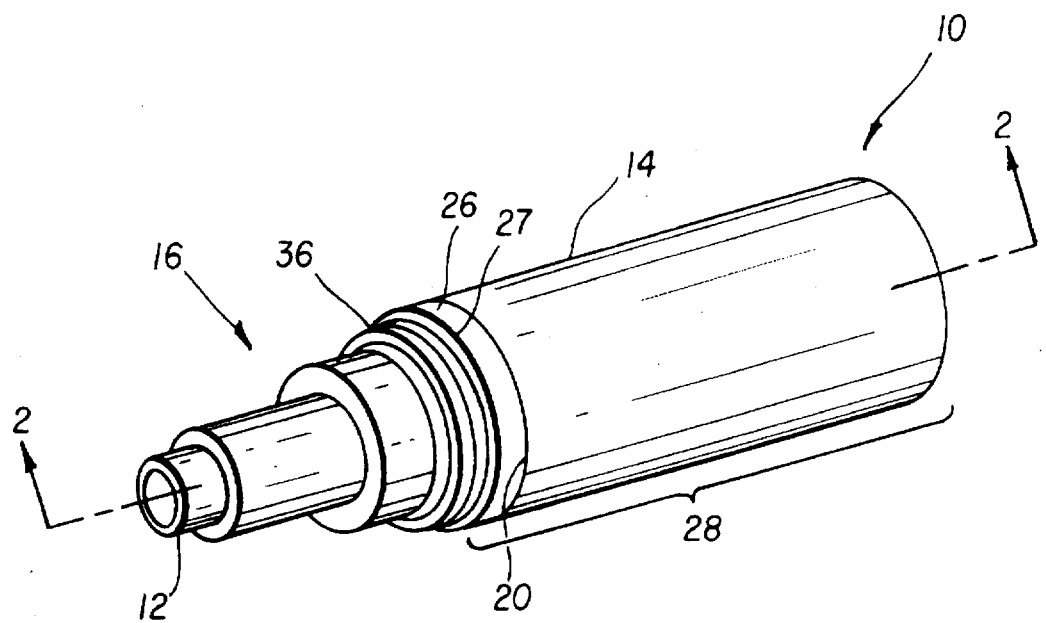
FIG. 1 is a perspective view of the pressure sensitive roller, showing only one end portion.
Figure 2:
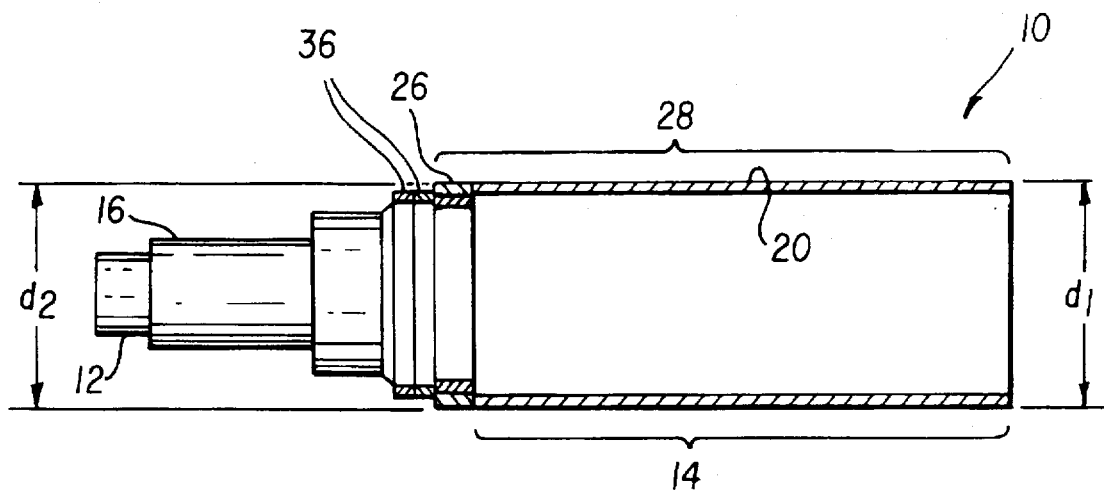
FIG. 2 is a section view along line 2—2 of FIG. 1, showing only one end of the roller.

Turning first to FIGS. 1–3, the roller, or alternately pressure sensitive roller, 10, of the invention for conveying web in a resin coming environment is illustrated. As best seen in FIG. 3, pressure sensitive roller 10 comprises a core 12 having a main portion 14 and first and second end portions 16,18. In FIGS. 1–2, a pressure sensitive layer 20 having a diameter ($d_1$) surrounds the core 12. Pressure sensitive layer 20 extends widthwise along the main portion 14 of the core 12 between the first and second end portions 16, 18. A suitable pressure sensitive layer preferred by the inventors is Hypalon™ manufactured by The DuPont Corporation of Beaumont, Tex. and supplied by American Roller Inc. of Cleveland, Ohio. Other materials that may be used with equally satisfactory results include a general purpose silicon.

As illustrated in FIGS. 2–4, a solid polymeric material layer or sleeve 26 is arranged on the first and second end portions 16,18 of core 12 abuttingly against the pressure sensitive layer 20 (only one end portion shown in details). In one embodiment, sleeve 26 may be arranged on either the core 12 abuttingly against the pressure sensitive layer 20. Alternatively, sleeve 26, preferably is arranged along opposing end portions of the pressure sensitive roller 10 abuttingly against the pressure sensitive layer 20. Preferably, the polymeric material layer 26 is machined when positioned on the core 12 so that its diameter ($d_2$) is somewhat less than the diameter ($d_1$) of the pressure sensitive layer 20 which is also slightly machined. Machining of both the pressure sensitive and polymeric material layers 20,26 so that there is a slight undercut portion 27 between the two layers ((FIG. 1) is believed to provide a generally robust surface for conveying web. Skilled artisans will appreciate that arcuate groovings (not shown) may be formed in opposite end portions of the pressure sensitive layer 20 for receiving a polymeric material layer 26 as described herein. In this configuration, it would be important that the edges of the web on the web transfer surface at least partially ride on the polymeric material layer 26 to protect the roller from wetting by the molten polyethylene resin.

It is important to the invention that the solid polymeric material layer 26 have a thickness in the range of about 0.75 inches to about 1.0 inch, while 1.0 inch is the most preferred thickness. The thickness of the polymeric material layer 26 is important to the integrity of the web transport surface 28 formed by the pressure sensitive layer 20 and the abutting polymeric material layer 26. Moreover, the thickness of the polymeric material layer 26 on core 12 imparts durability to the web transport surface 28 as well as eliminates the need for frequent roller maintenance. More importantly to the invention, the polymeric material layer or sleeve, 26, has been found to resist attacks and adherence by overflow molten polyethylene resin coating. In a typical resin coating environment, a curtain coat of molten polyethylene resin is deposited onto the conveyed web being coated and invariably the coating material will deposit onto the web transport surface 28. Without the polymeric material layer 26 of the invention, the deposition of coating material on the web transport surface has been known to cause substantial production problems. Thus, this latter property of the roller 10 of the invention is deemed related specifically to the use of a solid Teflon sleeve 26, as described further below. Consequently, the pressure sensitive roller 10 of the invention when used in the resin coating environments provides a more robust web transport surface having a longer roller life.

In FIG. 2, the polymeric material layer or sleeve, 26, preferably comprising a fully fluorinated copolymer of hexafluoropropene and tetrafluoroethylene, such as Teflon™, is keyed to the second or pressure sensitive roller 20 and retained axially by threaded nuts, as described below. To reduce pressure on the polymeric material layer 26 on both end portions of the core 12, the polymeric layers are machined to a diameter ($d_2$). As indicated, it is preferred that diameter ($d_2$) is somewhat smaller than diameter ($d_1$) of the pressure sensitive layer 20.

As depicted in FIGS. 3, 5 & 6, corresponding engageable notched portions defining a first key-way 30 in the pressure sensitive roller 10 and a second key-way 32 in the inside diameter of the polymeric material layer 26 are formed to provide more stability of the web transport surface. In this way, a key (not shown) can be slid into locking engagement with the first and second key-ways 30, 32 thereby restricting radial movements of the polymeric material layer 26 on the core 12.

Referring again to 1–3, also important to the invention, pressure sensitive roller 10 of the invention includes means 36 for securing the polymeric material layer or sleeve 26 on each first and second end portion against axial movement along the core 12. The preferred means for securing includes at least one threaded locking ring assembly 36 (FIG. 1) that is threadably mounted on corresponding threaded portion 38 (FIG. 3) of core 12. In our invention, means, or the locking ring assembly, 36, for securing is urged against a peripheral edge (not shown) of the solid polymeric material layer 26 so as to correspondingly urge the polymeric material layer 26 into substantial uniformity with the pressure sensitive layer 20. We prefer using a pair of locking ring assemblies 36 (FIG. 2) on both end portions 16,18 of the core 12 to ensure that the sleeve 26 is securely held in place on the core 12. Therefore, both polymeric material layers or sleeves 26 positioned on either end portions of the core 12 are securely locked against further axial movement by locking ring assemblies 36. Those skilled in the art will appreciate that there are other means of securing the sleeves to the core include using screws or threadable sleeves, or gluing.

PARTS LIST 10 pressure sensitive roller
11 web
12 core
14 main portion
16 first end portion
18 second end portion
20 pressure sensitive layer
21 means for advancing the web 12
22 first roller or chill roller
24 second roller or pressure sensitive roller
26 sleeve/polymeric material layer
27 undercut portion
28 web transport surface
30 first key-way
32 second key-way
36 means/locking ring assembly
38 threaded portion While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claim or claims, including the full range of equivalency to which each element thereof is entitled.

We claim:

1. A roller for conveying web in a resin coating environment, comprising:

a core having a main portion and first and second end portions;

a pressure sensitive layer having diameter ($d_1$) surrounding said core, said pressure sensitive layer extending widthwise along said main portion of said core between said first and second end portions;

a solid polymeric material layer having diameter ($d_2$) arranged on said first and second end portions of said core abutting against said pressure sensitive layer, said solid polymeric material layer and said pressure sensitive layer forming a generally uniform rotatable surface for conveying said web; and, means for securing said polymeric material layer against axial movement along the core, said means for securing being threadably urged against a peripheral edge of said solid polymeric material layer so as to correspondingly urge said polymeric material layer into uniformity with said pressure sensitive layer.

2. The roller recited in claim 1, wherein said polymeric material layer comprises a material resistant to attack and wetting by a molten polyethylene resin.

3. The roller recited in claim 2, wherein said material comprises a fully fluorinated copolymer of hexafluoropropene and tetrafluoroethylene.

4. The roller recited in claim 3, wherein said polymeric material layer has a width of about 1.5 inches.

5. The roller recited in claim 3, wherein said polymeric material layer has a thickness of at least about 0.75 inches.

6. The roller recited in claim 1, wherein said means for securing said polymeric material layer comprises at least one threaded locking ring assembly adapted for fitting a correspondingly threaded portion on said core, said threaded locking ring assembly being snugly abutted against said peripheral edge of said polymeric material layer on said core so as to prevent axial movement of said polymeric material layer about said core.

7. The roller recited in claim 1 wherein said core further comprises at least one notched portion forming a keyway for receiving a key-like member, said key-like member being arranged in an inside diameter of said polymeric material layer for lockingly engaging said notched portion of said core and thereby securing said polymeric material layer against radial movement about the core.

8. The roller recited in claim 1, wherein said core further comprises first and second collar portions arranged on each said first and second end portions adjacent to said locking ring assembly.

9. The roller recited in claim 1 wherein said pressure sensitive layer and said polymeric material layer are each machined down so that diameter ($d_1$) of said pressure sensitive layer is somewhat larger than diameter ($d_2$) of said polymeric material layer.

* * * * *